(12) United States Patent
Raniwala

(10) Patent No.: US 6,742,552 B2
(45) Date of Patent: Jun. 1, 2004

(54) IN-LINE AND IN-CONTAINER FLAVOR/ADDITIVE DOSING METHOD AND SYSTEM FOR BEVERAGE MANUFACTURING

(75) Inventor: Subodh Raniwala, Mundelein, IL (US)

(73) Assignee: Stokely-Van-Camp, Inc., Chicago, IL (US)

( * ) Notice: Subject to any disclaimer, the term of this patent is extended or adjusted under 35 U.S.C. 154(b) by 0 days.

(21) Appl. No.: 10/288,046

(22) Filed: Nov. 5, 2002

(65) Prior Publication Data

US 2004/0084104 A1 May 6, 2004

(51) Int. Cl.$^7$ .................................................. B65B 3/00
(52) U.S. Cl. ........................ 141/103; 141/9; 141/11; 141/82; 141/104; 222/144.5; 222/146.2; 53/127; 53/474; 53/240
(58) Field of Search ................. 141/9, 11, 82, 141/100, 103, 104; 222/146.2, 144.5; 53/127, 237, 240, 474

(56) References Cited

U.S. PATENT DOCUMENTS

| | | | | |
|---|---|---|---|---|
| 2,103,158 A | * | 12/1937 | Kantor | ........................ 53/279 |
| 4,860,802 A | * | 8/1989 | Yamaguchi et al. | ........... 141/6 |
| 5,493,840 A | | 2/1996 | Cane | |
| 5,687,779 A | | 11/1997 | Andersson et al. | |
| 6,044,875 A | | 4/2000 | Andersson et al. | |
| 6,065,510 A | | 5/2000 | Andersson et al. | |
| 6,247,507 B1 | | 6/2001 | Soehnlen et al. | |
| 6,250,344 B1 | | 6/2001 | Gerritse | |
| 6,405,764 B1 | | 6/2002 | Wang | |
| 6,412,527 B1 | * | 7/2002 | Brice | .......................... 141/103 |

* cited by examiner

Primary Examiner—J. Casimer Jacyna
(74) Attorney, Agent, or Firm—Cook, Alex, McFarron, Manzo, Cummings & Mehler, Ltd.

(57) ABSTRACT

A method and system for producing a flavored beverage wherein the flavor is added in a separate step to a combination of the base ingredients of the beverage is provided. The flavor can be added to a container either before, during or after a thermally processed master batch base is hot filled into the container.

17 Claims, 3 Drawing Sheets

IN-LINE AND IN-CONTAINER FLAVOR/ADDITIVE DOSING METHOD AND SYSTEM FOR BEVERAGE MANUFACTURING

FIELD OF THE INVENTION

The present invention is directed to a method and system for beverage manufacturing and in particular to hot fill beverage manufacturing. More specifically, the present invention is in a field wherein beverages are prepared having a variety of different flavors and/or other additives. The invention is more particularly directed to a method for manufacturing a beverage wherein a selected flavor is added into containers, either before, during or after the containers are hot filled with a common base.

BACKGROUND OF THE INVENTION

Many beverages are offered in a variety of flavors. In many such instances, a base beverage formula is varied by having variations in flavor, color or possible other additives being made to the base formula so as to achieve the multiple flavor array of beverages. As explained infra, with all such beverages, how and when these flavors and additives are added to the base formula is related to a number of different criteria and conditions.

With any such beverages which are intended for wide distribution, shelf stability and/or bacterial control are important considerations for these products, especially those which need not be stored or displayed under refrigeration. Products of this type can fall into two broad categories. The first category are beverages which are filled into containers when the beverages are at elevated temperatures. Often these are referred to as hot filled beverages. The other category are beverages which are not filled hot but instead include a preservative component or composition. Thermal processing of beverages is considered advantageous as it stabilizes a formula microbiologically, while maintaining most of the desired sensory qualities. In contrast, preservatives formulations often have negative sensory attributes. The present invention is particularly directed to the thermally processed beverages.

Hot filling is designed for packaging of liquids which must be placed in the container while hot to provide for adequate extended shelf life in accordance with well-known principles. Usually this involves the use of heat to pasteurize or commercially sterilize the product. Typically, the heat effectively commercially sterilizes the beverage immediately prior to it being placed in the container. While the beverage is still hot, the container is filled with the hot, sterilized beverage. This also has the effect of commercially sterilizing the container. After the usual hot filling events, the container then is capped. Currently, there are two widely used methods and systems typically used for producing hot filled beverages.

One of these methods and systems is shown in FIG. 3. As shown in FIG. 3, a complete beverage 110 is prepared with all the ingredients for the beverage. By this stage, a syrup and/or total additive package is added to a liquid, or liquids, such as for example water, in order to fully make up the beverage. For example, in an isotonic sports beverage, an additive package, that includes the sugars or carbohydrates, such as glucose, fructose and sucrose, electrolytes, flavor and color in the composition, is added to water and stirred or blended together. Other ingredients, such as for example, citric acid, would also be included, if desired in the final product. The composition then is sent to be thermally processed by suitable heating equipment. During such thermal processing, the temperature of the beverage is elevated to approximately 168° F.–200° F. (75.5° C. to 93.33° C.), preferably 170° F.–190° F. (76.67° C. to 87.77° C.), approximately for 3 seconds to 1 minute. Heat exchangers can be used to heat and hold the beverage at a certain temperature. The thermally processed hot beverage then is sent to a filler 114 such as a rotary filler generally known in the art which fills the container 116 with the hot beverage. Other types of fillers, such as for example linear fillers, volumetric fillers, pressure or gravity fillers could also be used. The hot filled container then travels down the assembly line, such as a conveyer mechanism, where eventually a cap is placed on the container by a capper 118. Labeling and/or packaging typically follows.

In another method and system (not shown), is a continuous process. In this process, the beverage will flow through a main pipe. Streams are connected to the main pipe for adding ingredients to the mixture, e.g. a sugar stream, a flavor stream, etc. The ingredients are combined in the pipe. The complete formula is combined together prior to being thermally processed. Thereafter, the method and system is the same as the first method described above. Hence, in order to make a flavor change, the pipe, thermal processing unit and hot filler all need to be cleaned before a new flavored beverage can be produced.

Both of these methods and systems have a number of drawbacks. In particular, because the complete beverage travels through the thermal processing and the hot fill equipment in such prior art approaches, all of this equipment has to be shut down and cleaned whenever there is a flavor change. Further, only one flavor can be produced at a time. For example, if a lemon flavored drink is being made and an orange flavored drink is scheduled to be made thereafter, the line needs to be shut down to clean all of the lemon flavor from the product mixing equipment, thermal processing equipment and hot fill equipment before the orange flavored drink can be produced. Otherwise, the orange flavored drink will not taste right and/or will not give a consistent product over the run for this beverage. This results in significant down time of the production line. For example, a typical line could have 3 or 4 or more flavor changes a day, with each flavor change having a typical down time of 20–40 minutes. Hence, somewhere between 1–2.5 hours or more of a typical production shift are wasted down time.

Furthermore, because the beverage with flavor therein is thermally processed in typical existing flavored beverage production, some of the flavor in the beverage is lost, damaged or otherwise modified during heating. Flavor loss also can occur in the bottle handling stage between the filling of the beverage container and the capping of the container. This occurs as the bottles travel along a conveyer mechanism which, in the usual high-speed bottling line, creates a centrifugal force in the bottle and causes spillage, particularly of the flavored complete formulation. As a result, the flavor in the beverage is not as strong as desired due to flavor loss prior to capping.

Furthermore, most flavors degrade within 10–15 minutes. Therefore, usual good manufacturing practices place a 10 to 15 minute limit on recirculation of beverages which are flavored. This can result in requiring a new batch to be prepared prematurely and due solely to a concern for flavor degradation.

Multi-stage processing has been used in the milk industry to produce various types of milk. For example, U.S. Pat. No. 5,687,779 (Andersson et al.) discloses a fill system for filling a container with a primary product, such as skim milk, and a secondary product, such as cream, to produce milk products having a selected one of several milkfat concentrations. U.S. Pat. No. 6,247,507 (Sochnlen et al.) discloses a system for milk production wherein raw milk is subjected to a heat treatment (pasteurization) and then high fat and skim milk are separated from the raw milk. The skim milk and high fat are then combined in the desired proportions. The Sochnlen et al. patent states that the invention relates to beverage processing which involves milk, juices, fruit drinks and chocolate milk. Such references, however, are not directed to hot fill applications, to products having preservative components, or combinations thereof, nor are such references concerned with beverages having microbiological stability or shelf stability or to storage/display without refrigeration.

The present invention is directed to a method and system for overcoming these drawbacks in the context of an arrangement which produces multiple products having different flavors and possible other characteristics. These products exhibit shelf stability qualities allowing them to be stored and displayed under room temperature and/or non-refrigerated conditions.

SUMMARY OF THE INVENTION

The present invention is directed to a method or process and a system for producing a flavored beverage wherein the flavor is added in a separate step to a combination of the base ingredients of the beverage. In a preferred embodiment, the base ingredients are combined together, thermally processed and hot filled into a container. The flavor is then added to the hot filled base in the container. In an alternative embodiment, the base ingredients are combined together and thermally processed. The flavor is added to the empty container and then the thermally processed ingredients are hot filled into the container with the flavor already therein. Capping or sealing of the container typically follows these steps. The invention is also directed to the product of this process.

The method and system of the present invention reduce down time for a flavor change in an industrial-scale bottling operation, as only the flavor dosing apparatus needs to be cleaned and not the whole system.

The method and system of the present invention also reduce flavor loss between flavor addition, filling and capping, as there is little handling of the containers filled with the flavored beverage and little time between these steps. Further, the dosing can occur after the containers have traveled down the conveyer line, where spilling typically occurs, and immediately prior to capping. As a result, the beverage produced by this method has better flavor.

The method and system of the present invention also allow for the production of more than one flavor on the same production line. For example, two or more flavor dosing assemblies could be used on the same line, each dosing assembly being charged with a flavor system different from the other doser or dosers.

The method and system of the present invention eliminates loss of flavor during thermal processing as the flavor is added after thermal processing. As a result, the beverage produced by this method has better flavor.

The method and system of the present invention can also be used to add other ingredients which may be heat sensitive but which do not require thermal processing.

With the method and system of the present invention, the filling process recirculation time limitation for flavored beverages not according to the invention is relaxed for the beverage base according to the invention, as there is no longer any worry about flavor degradation.

With the method and system of the present invention, flavor can be purchased and used in bulk which is more cost effective.

DETAILED DESCRIPTION OF THE PRESENTLY PREFERRED EMBODIMENTS

Figure 1:
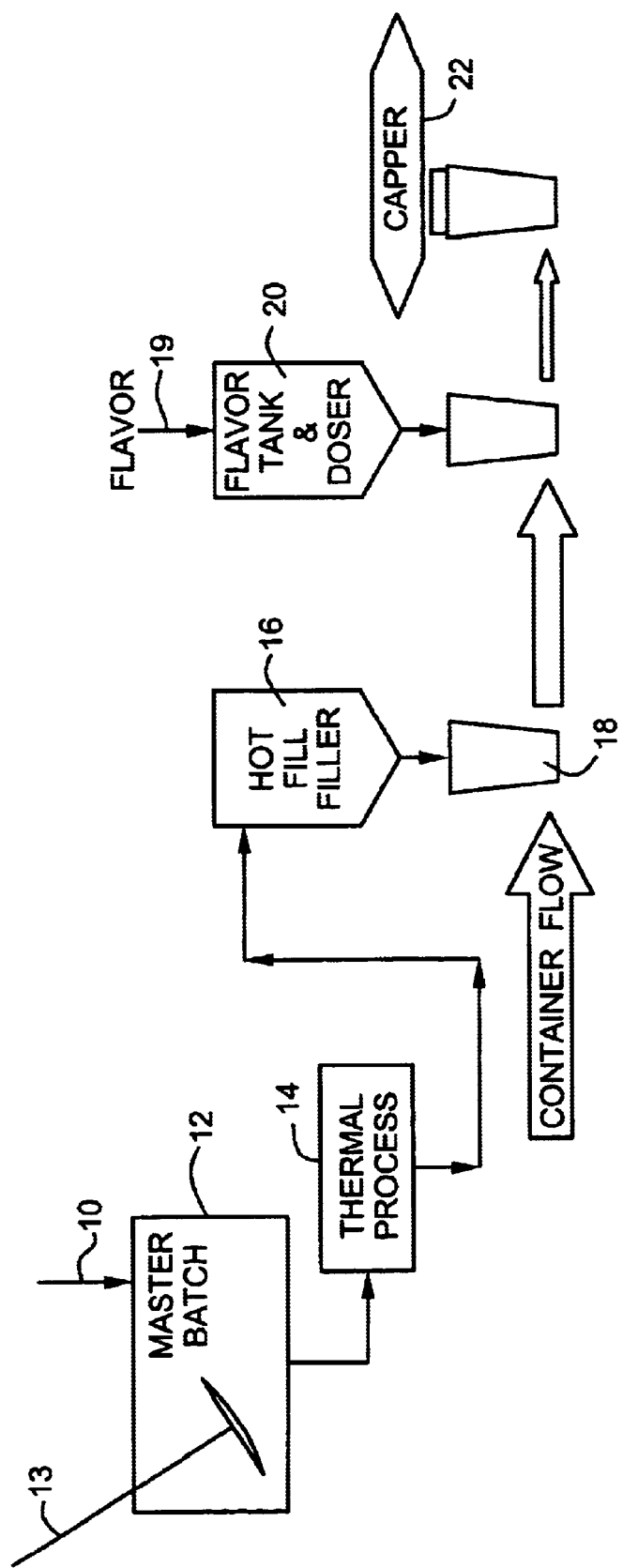
FIG. 1 is a block diagram of a first embodiment of the present invention.

A first embodiment of the present invention is illustrated in FIG. 1. As shown in FIG. 1, the main ingredients or the components needed for formulating a flavored beverage, except the flavor component and/or color (or minor ingredients that do not need to be heat treated), are added at 10 to form a master batch base mixture within a suitable container 12 or location along a continuous beverage formulation line. These ingredients can include both dry ingredients, which may be in the form of granules, a powder, a syrup or other additive package, and wet ingredients, such as for example water, for the beverage. In order to be sure these ingredients are effectively combined, blending or mixing usually occurs. For example, FIG. 1 shows a paddle mixer assembly 13. Other blending approaches can include spiral flow path, turbulence imparting members such as static or dynamic blades, and other suitable impingement surfaces. Alternatively to doing on a batch basis, the master base mixture can be formed by adding the base ingredients, except flavor, to liquid in a pipe for continuous production of the base mixture prior to thermal processing.

The thus formed mixture then is subject to thermal processing. Such thermal processing can occur along a continued beverage formulation line and/or involve transfer to a thermal processor 14, as illustrated in FIG. 1, in order to stabilize the mixture microbiologically. The thermal processing is conventional. After thermal processing, the mixture then is sent to a filler 16 for dispensing the heated master batch base into a container 18, an example being a formed polymeric bottle.

Figure 3:
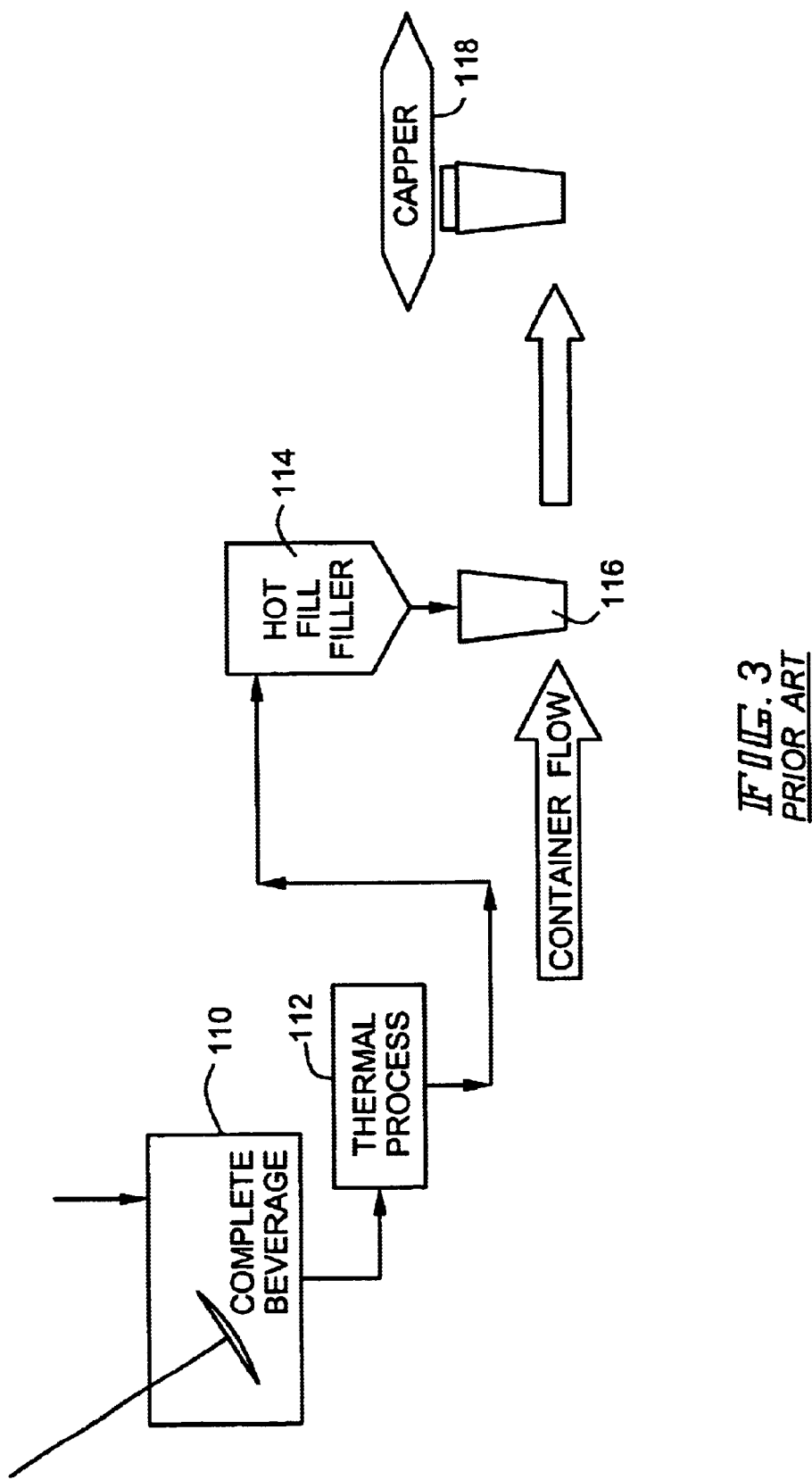
FIG. 3 is a block diagram of a conventional method and system for production of a beverage.

The filler typically is along the continuous beverage formulation line or involves transfer to the filler. The hot fill filler 16 is a conventional one, such as types noted regarding FIG. 3. Alternatively, the thermal processing and hot filling can be done in one step.

The hot filled container then proceeds to the next step where a flavor component adding apparatus or unit, such as a supply tank and doser 20 or similar type equipment, adds a selected flavor component 19 to the thermally processed master batch base in the hot filled container. For commercial purposes, a 6 or 7 head rotary doser can be used. A multi-head doser is advantageous in order for the flavor doser to keep up with a large quantity of containers on the conveyer line. Furthermore, if it is desired to produce more than one particular flavored beverage at a time, more than one dosing device may be used with each dosing device distributing a different flavor.

The flavor component includes a flavoring compound or composition and also can include color or other desired additives which are not within the master batch base but are a feature of the flavor or sensory profile being formed. In a further embodiment, other materials such as vitamins or micronutrients, which do not need to be thermally processed, can be added in this step. Thus, the flavor component can comprise flavors and other ingredients which need not be subjected to full thermal processing to which the master batch base mixture is subjected in order to maintain shelf stability. The flavor and other components added in this step are stabilized by the heat of the base mixture in the container. Preferably, the flavor component is injected into the master batch base mixture in the container. The container then is capped using a capper 22 or sealed or otherwise closed with a sealing or closing mechanism.

Figure 2:
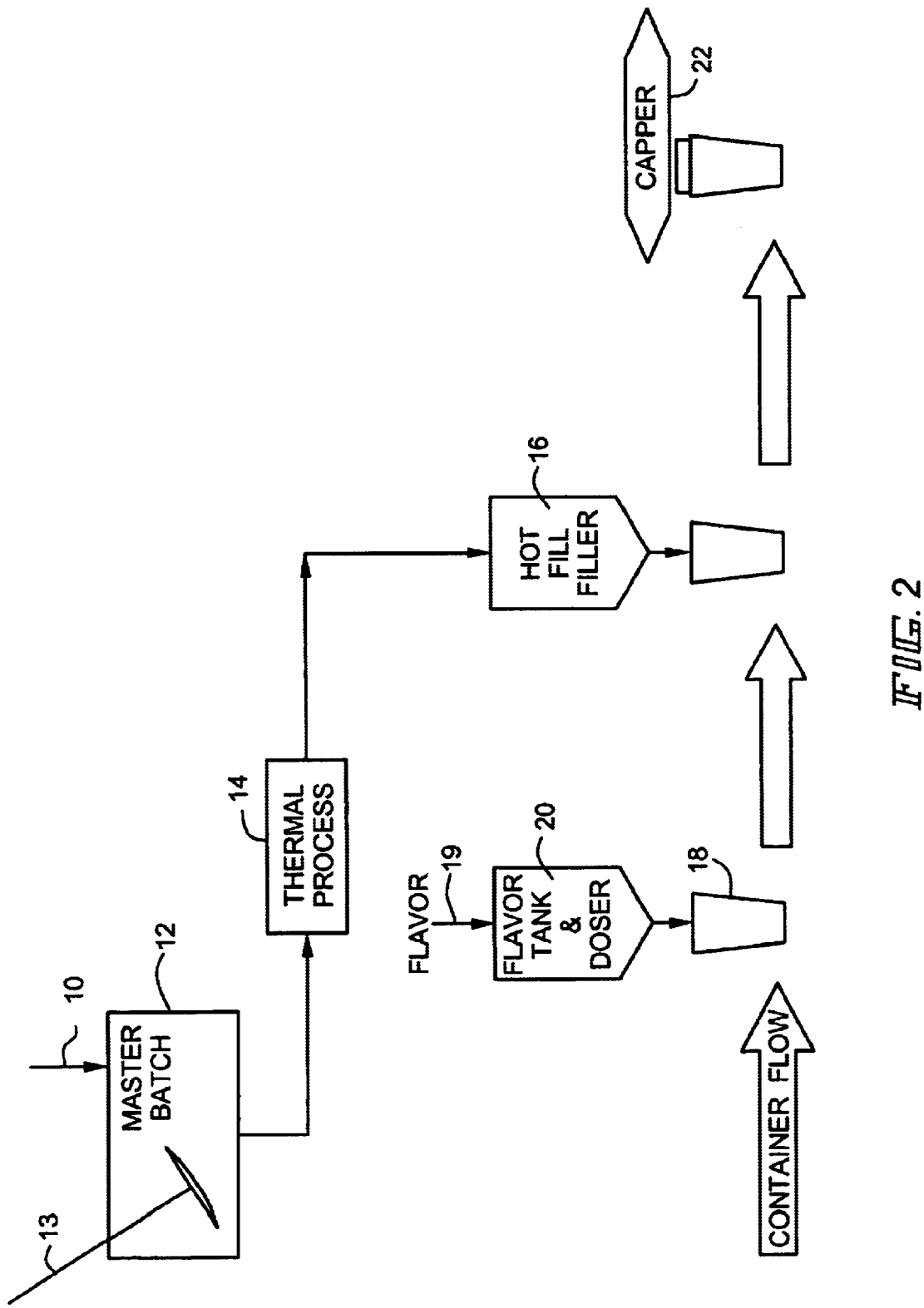
FIG. 2 is a block diagram of a second embodiment of the present invention.

In another embodiment of the present invention illustrated in FIG. 2, the master batch base 12 is prepared as described above in the first embodiment. However, instead of adding the flavor component after the container has been hot filled, the flavor component 19 is added to the container 18 before the container is hot filled. The flavor component 19 can be added using a supply tank and doser 20, such as that described above in the first embodiment, or similar type of equipment. The container is hot filled with the master batch base after the selected flavor component 19 (and possibly other minor ingredients mentioned above for the first embodiment) is added to the container 18. Preferably, the container is hot filled promptly after the flavor component has been added. Capping or sealing proceeds as recited in the first embodiment.

In a further embodiment, the master batch base is prepared and thermally processed as in the first embodiment. The flavor component is then added to the container simultaneously with hot filling of the container with the thermally processed master batch base. The container would then be capped or sealed, as in the first embodiment.

Beverages prepared in accordance with this method and system typically are of the non-carbonated variety. They are formulations which are offered with a variety of flavor or sensory characteristics. Often they will include coloration components which typically vary with different flavoring packages. Alternatively, the beverages which vary in flavor or sensory characteristics can have a consistent color, usually a so-called clear. In accordance with the invention, these types of components which vary from beverage product to beverage product are included in the dosing component which is not subjected to hot filling.

Preservatives may be included as desired or needed. In a typical hot filled beverage, preservatives need not be included. When present within the beverage, typical preservative components include sorbates, phosphates, benzoates, and the like. These can be present or added as alkali metal salts or as acids such as sorbic acid, benzoic acid or phosphoric acid. An example of a preservative salt is potassium sorbate. A typical phosphate is a sodium polyphosphate. Specific examples include sodium acid metaphosphate (SAMP) and sodium hexametaphosphate (SHMP). Preservatives of these general types, when included, typically will be present at levels of at least about 0.01 weight percent up to about 0.5 weight percent, both based upon the total weight of the beverage composition.

Other typical components and beverage products of these types include juices and teas. Juices and/or teas can be included at a variety of differing levels, depending upon the beverage product. A clear product would have no or very low levels of juices, juice concentrates or teas. These levels can be as low as about 0.1 weight percent for juices and about 0.02 weight percent for tea solids. A typical upper limit for tea solids is about 0.25 weight percent of the total beverage. While all juices could be virtually at any level, most products of the type discussed herein will be of the so-called dilute juice type, for example, one having no more than 40% by weight fruit juice in the total beverage composition. So-called juice products are characteristic of juice-containing beverages which are formulated with an array of flavors.

Sweeteners often can be included. When provided as sugars, these sweeteners can be present at levels as high as 12 weight percent of the total weight of the beverage. Sugars of this type include sucrose and high fructose corn syrup. So-called non-caloric or artificial sweeteners can be included either alone or in combination with sugars. For example, aspartame would be present at a level as high as about 350 ppm (0.035 weight percent) of the beverage composition. Others include up to 200 ppm (0.02 weight percent) of acesulfame-K and/or up to about 200 ppm (0.02 weight percent) sucralose. These would be added as desired or needed for sweetness and caloric content.

Many of these beverage products have a relatively low pH and/or can have an acidulant added to it. The most common acidulant in this regard is citric acid. A typical acidulant can be present at between 0.01 and 0.05 weight percent of the beverage weight. Beverages of this type can have a pH in the range of 2.0 and 5.5, depending on the type of product to be produced. A beverage product of moderate acidity could have a pH in the range of about 2.2 to about 6.4. A more acidic type of beverage would have a pH in the range of between about 2.3 and about 4.2, more preferably between about 2.8 and about 4.2.

Included within these beverages are so-called isotonic beverages. Beverages of this type include electrolyte packages and/or salt blends. Such additives often will be present at levels of between about 0.05 and about 0.2 weight percent, based on the total weight of the beverage. These can provide a source of important minerals such as potassium, magnesium and calcium.

Individual vitamins or vitamin packages can be included as desired. Typical vitamins in this regard include L-ascorbic acid (Vitamin C), alpha-tocopherol (Vitamin E), Vitamin A, various so-called B vitamins including riboflavin (Vitamin B2), Vitamin B6, Vitamin B12, pantothenic acid and other essential and non-essential vitamins such as Niacin. Carotenoids also can be included such as beta-carotene or pro-vitamin A.

Depending upon the particular flavor or sensory characteristic of the flavored beverage according to the invention, clouding agents and the like can be included and are due to give a different appearance and/or texture to the beverage. Anti-fungal agents also can be included to the extent needed for the particular beverage.

Certain flavor components can include emulsion and gum factors. Examples include gum arabic, esther gum, gellan gum, xanthone gum and glycerol esther of gum rosin. Flavor packages can be oil-in-water emulsions or contain emulsion systems as components.

Many of the beverage products made according to the method and system of the present invention contain significant quantities of water. Water contents can be as high as about 95 weight percent water. Non-juice beverages or dilute juice beverages will have at least about 60 weight percent water. These percentages are based upon the total weight of the beverage product. The invention finds particular suitability for isotonic-type beverages, which typically have a water content of 80 weight percent or above. An example of a product in this regard has between about 90 and 92 weight percent water. The so-called hardness of the water often will be controlled. Usual hardness levels for these types of products is in the low-to-moderate range, having no more than about 120 ppm of so-called hardness as calcium carbonate.

It will be understood that the embodiments and examples of the present invention, which have been described, are illustrative of some of the applications of the principles of the present invention. Numerous modifications may be made by those skilled in the art without departing from the true spirit and scope of the invention.

We claim:

1. A method for producing a flavored beverage comprising:
    combining components needed for formulating a flavored beverage, exclusive of a flavor component, to form a master batch base;
    thermally processing said master batch base to a degree adequate to stabilize microbiologically the beverage being produced and hot filling said master batch base into a container;
    adding said flavor component to said hot filled master batch base in said container to produce a flavored beverage; and
    sealing said container after said adding the flavor component,
    wherein said flavored beverage is an isotonic beverage and wherein said formulating of the master batch base comprises combining water, electrolytes and a sweetener.

2. The method of claim 1 wherein said process is done on a continuum.

3. The method of claim 1 wherein said process is done on a batch basis.

4. The method of claim 1 wherein said flavor component is added after said hot filled master batch base is added to said container.

5. The method of claim 1 wherein said flavor component is added to said container simultaneously with said hot filled master batch base.

6. The method of claim 1 wherein a preservative is added to the beverage.

7. A flavored beverage product made by the process of claim 1.

8. A method for producing a variety of hot filled different flavored beverages from a single base batch comprising:
    providing a base batch for a beverage;
    thermally processing said base batch to a degree adequate to stabilize microbiologically to the flavored beverage and hot filling said base batch into a container;
    adding a flavor component to said base batch in said container to form a flavored beverage, wherein a variety of different flavor components can be added to said base batch to form different flavored beverages; and
    capping said container after adding said flavor component,
    wherein said flavored beverage is an isotonic beverage and wherein said formulating of the master batch base comprises combining water, electrolytes and a sweetener.

9. A flavored beverage product made by the process of claim 8.

10. A method for producing a flavored beverage comprising:
    adding a flavor component to a container, said flavor component being selected from a plurality of flavor components suitable for incorporating into the beverage;
    combining base ingredients of said flavored beverage, except said flavor component, to form a master batch base; and
    thermally processing said master batch base to a degree adequate to stabilize microbiologically to said flavored beverage and hot filling said master batch base into said container containing said flavor component to produce a flavored beverage,
    wherein said flavored beverage is an isotonic beverage and wherein said formulating of the master batch base comprises combining water, electrolytes and a sweetener.

11. A flavored beverage product made by the process of claim 10.

12. A system for producing a variety of flavored beverages from a single master base batch comprising:
    a master batch forming location for combining all base ingredients of the flavored beverage, except for a flavor component, to form a master batch base;
    a thermal unit for heat processing said master batch base to thermally processed master batch base;
    a hot filler for hot filling a container with said thermally processed master batch base; and
    a dosing device for adding at least one selected flavor component from a variety of different flavor components to said container in order to form a beverage having one of said variety of different flavor components from the same master batch,
    wherein said flavored beverage is an isotonic beverage and wherein said formulating of the master batch base comprises combining water, electrolytes and a sweetener.

13. The system according to claim 12, wherein said dosing device is positioned to add said selected flavor component into the container before the container is filled with said thermally processed master batch base.

14. The system according to claim 12, wherein said dosing device is positioned to add said selected flavor component into the container after the container is filled with said thermally processed master batch base.

15. The system according to claim 12, wherein said dosing device is positioned to add said selected flavor component into the container substantially simultaneously with the filling of the container with said thermally processed master batch base.

16. The method for producing a flavored beverage comprising:
    combining components needed for formulating a flavored beverage, exclusive of a flavor component, to form a master base;
    thermally processing said master base to a degree adequate to stabilize microbiologically the flavored beverage being produced;
    adding said flavor component to a container while substantially simultaneously hot filling said master base into said container to produce a flavored beverage; and
    sealing said container after said adding the flavor component and hot filling,
    wherein said flavored beverage is an isotonic beverage and wherein said formulating of the master batch base comprises combining water, electrolytes and a sweetener.

17. A flavored beverage product made by the process of claim 16.

* * * * *

UNITED STATES PATENT AND TRADEMARK OFFICE
CERTIFICATE OF CORRECTION

PATENT NO. : 6,742,552 B2
DATED : June 1, 2004
INVENTOR(S) : Subodh Raniwala

It is certified that error appears in the above-identified patent and that said Letters Patent is hereby corrected as shown below:

<u>Column 3,</u>
Line 4, delete "Sochnlen" insert -- Soehnlen --.
Lines 8-9, delete "Sochnlen et al." insert -- Soehnlen --.

Signed and Sealed this

Fourteenth Day of December, 2004

JON W. DUDAS
*Director of the United States Patent and Trademark Office*